US012069156B2

(12) United States Patent
Tueno et al.

(10) Patent No.: US 12,069,156 B2
(45) Date of Patent: Aug. 20, 2024

(54) PRIVATE DECISION TREE EVALUATION USING AN ARITHMETIC CIRCUIT

(71) Applicant: SAP SE, Walldorf (DE)

(72) Inventors: Anselme Tueno, Walldorf (DE); Yordan Boev, Walldorf (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/221,665

(22) Filed: Jul. 13, 2023

(65) Prior Publication Data

US 2023/0379135 A1    Nov. 23, 2023

Related U.S. Application Data

(62) Division of application No. 16/573,827, filed on Sep. 17, 2019, now Pat. No. 11,750,362.

(51) Int. Cl.
| | |
|---|---|
| *H04L 9/00* | (2022.01) |
| *G06F 40/126* | (2020.01) |
| *G06F 40/205* | (2020.01) |
| *G06N 5/01* | (2023.01) |
| *G06N 20/00* | (2019.01) |

(Continued)

(52) U.S. Cl.
CPC ............ *H04L 9/008* (2013.01); *G06F 40/126* (2020.01); *G06F 40/205* (2020.01); *G06N 5/01* (2023.01); *G06N 20/10* (2019.01); *H04L 9/0618* (2013.01); *H04L 2209/08* (2013.01)

(58) Field of Classification Search
CPC ... H04L 9/008; H04L 9/0618; H04L 2209/08; G06F 40/126; G06F 40/205; G06N 5/01; G06N 20/10; G06N 20/00
See application file for complete search history.

(56) References Cited

U.S. PATENT DOCUMENTS

| | | | |
|---|---|---|---|
| 2010/0114964 A1* | 5/2010 | Kerschbaum | ......... H04L 9/3234 713/153 |
| 2012/0201378 A1* | 8/2012 | Nabeel | .................... H04L 9/008 380/255 |

(Continued)

OTHER PUBLICATIONS

Private yet Efficient Decision Tree Evaluation, by Joye et al., published 2018 (Year: 2018).*

(Continued)

*Primary Examiner* — Vu V Tran
(74) *Attorney, Agent, or Firm* — SCHWEGMAN LUNDBERG & WOESSNER, P.A.

(57) ABSTRACT

A non-interactive protocol is provided for evaluating machine learning models such as decision trees. A client can delegate the evaluation of a machine learning model such as a decision tree to a server by sending an encrypted input and receiving only the encryption of the result. The inputs can be encoded as vector of integers using their binary representation. The server can then evaluate the machine learning model using a homomorphic arithmetic circuit. The homomorphic arithmetic circuit provides an implementation that requires fewer multiplication than a Boolean comparison circuit. Efficient data representations are then combined with different algorithmic optimizations to keep the computational overhead and the communication cost low. Related apparatus, systems, techniques and articles are also described.

20 Claims, 2 Drawing Sheets

(51) Int. Cl.
*G06N 20/10* (2019.01)
*H04L 9/06* (2006.01)

(56) References Cited

U.S. PATENT DOCUMENTS

| | | | |
|---|---|---|---|
| 2015/0089243 A1* | 3/2015 | Veugen | H04L 9/008 713/190 |
| 2016/0156595 A1* | 6/2016 | Wu | H04L 9/008 713/168 |
| 2017/0372226 A1 | 12/2017 | Costa et al. | |
| 2019/0190714 A1 | 6/2019 | Joye et al. | |
| 2020/0342331 A1* | 10/2020 | Takenouchi | G06F 16/2246 |
| 2021/0083841 A1 | 3/2021 | Tueno et al. | |
| 2021/0097195 A1* | 4/2021 | Franke | G06F 21/602 |
| 2021/0406701 A1* | 12/2021 | Wang | G06N 5/01 |

OTHER PUBLICATIONS

"U.S. Appl. No. 16/573,827, Examiner Interview Summary mailed Feb. 10, 2023", 2 pgs.

"U.S. Appl. No. 16/573,827, Non Final Office Action mailed Jan. 25, 2023", 12 pgs.

"U.S. Appl. No. 16/573,827, Notice of Allowance mailed Apr. 18, 2023", 12 pgs.

"U.S. Appl. No. 16/573,827, Response filed Feb. 27, 2023 to Non Final Office Action mailed Jan. 25, 2023", 10 pgs.

"U.S. Appl. No. 16/573,827, Response filed Nov. 14, 2022 to Restriction Requirement mailed Sep. 13, 2022", 6 pgs.

"U.S. Appl. No. 16/573,827, Restriction Requirement mailed Sep. 13, 2022", 6 pgs.

Zhan, Justin, "Using Homomorphic Encryption For Privacy-Preserving Collaborative Decision Tree Classification", (2007).

* cited by examiner

PRIVATE DECISION TREE EVALUATION USING AN ARITHMETIC CIRCUIT

CROSS-REFERENCE TO RELATED APPLICATIONS

This application is a divisional of prior application Ser. No. 16/573,827, filed on Sep. 17, 2019, which is incorporated by reference herein in its entirety.

TECHNICAL FIELD

The subject matter described herein relates to the evaluation of a machine learning model such as a decision tree using an arithmetic circuit.

BACKGROUND

Machine learning (ML) classifiers are valuable tools in many areas such as healthcare, finance, spam filtering, intrusion detection, remote diagnosis, etc. To perform their task, these classifiers often require access to personal sensitive data such as medical or financial records. Therefore, there is a need for technologies that preserve the privacy of the data, while benefiting from the advantages of ML. On the one hand, the ML model itself may contain sensitive data. For example, a bank that uses a decision tree for credit assessment of its customers may not want to reveal any information about the model. On the other hand, the model may have been built on sensitive data. It is known that white-box and sometimes even black-box access to an ML model allows so-called model inversion attacks, which can compromise the privacy of the training data.

SUMMARY

In a first aspect, a plaintext data set is homomorphically encrypted component-wise. In addition, a plurality of random strings are generated so that an encrypted input can be formed comprising the plurality of random strings and the homomorphically encrypted data set. The encrypted input can be transmitted to a server executing a decision tree for evaluation using a homomorphic arithmetic circuit. Data characterizing the evaluation is later received from the server and such data can be decrypted to result in the evaluation.

In an interrelated aspect, an encrypted input is received by a server from a client. The server, using a homomorphic arithmetic circuit, then generates a classification of the data set using a decision tree. The generated classification is then provided by the server to the client to enable the client to decrypt the classification.

The decision tree can be a machine learning model that maps an n-dimensional attribute vector to a finite set of classification labels. The decision tree can include a plurality of internal nodes that each comprise a test condition, and a plurality of leaf nodes that each comprise a classification label. The arithmetic circuit can evaluate the decision tree using an efficient integer comparison algorithm requiring fewer multiplications than a Boolean comparison circuit.

A decision result can be computed for each internal node. Thereafter, for each leaf node, the computed decision results are aggregated along a corresponding path to such leaf node to determine whether one such leaf node has been reached by a classification algorithm. The provided generated classification can include the classification labels.

The server can receive a public key and an evaluation key from the client. The data set can homomorphically encrypted by the client to result in the encrypted input. The data set can be plaintext and it can be encoded as vector of integers and encrypted component-wise.

A plurality of random integers can be generated which can form part of the encrypted input along with the data set.

The decision tree can be homomorphically evaluated. An output of the homomorphic evaluation of the decision tree can include only a ciphertext of a corresponding computation result.

A plurality of attribute vectors can be encoded by the client such that the server can evaluate them together in a single protocol run.

A plurality of threshold values can be encoded by the server and such threshold values can be evaluated together in a single operation.

The providing can include transmitting the generated classification to the client over a network so that the client can decrypt the generated classification.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the evaluation of machine learning models such as decision trees without revealing sensitive information of the model or the consumer of the model.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
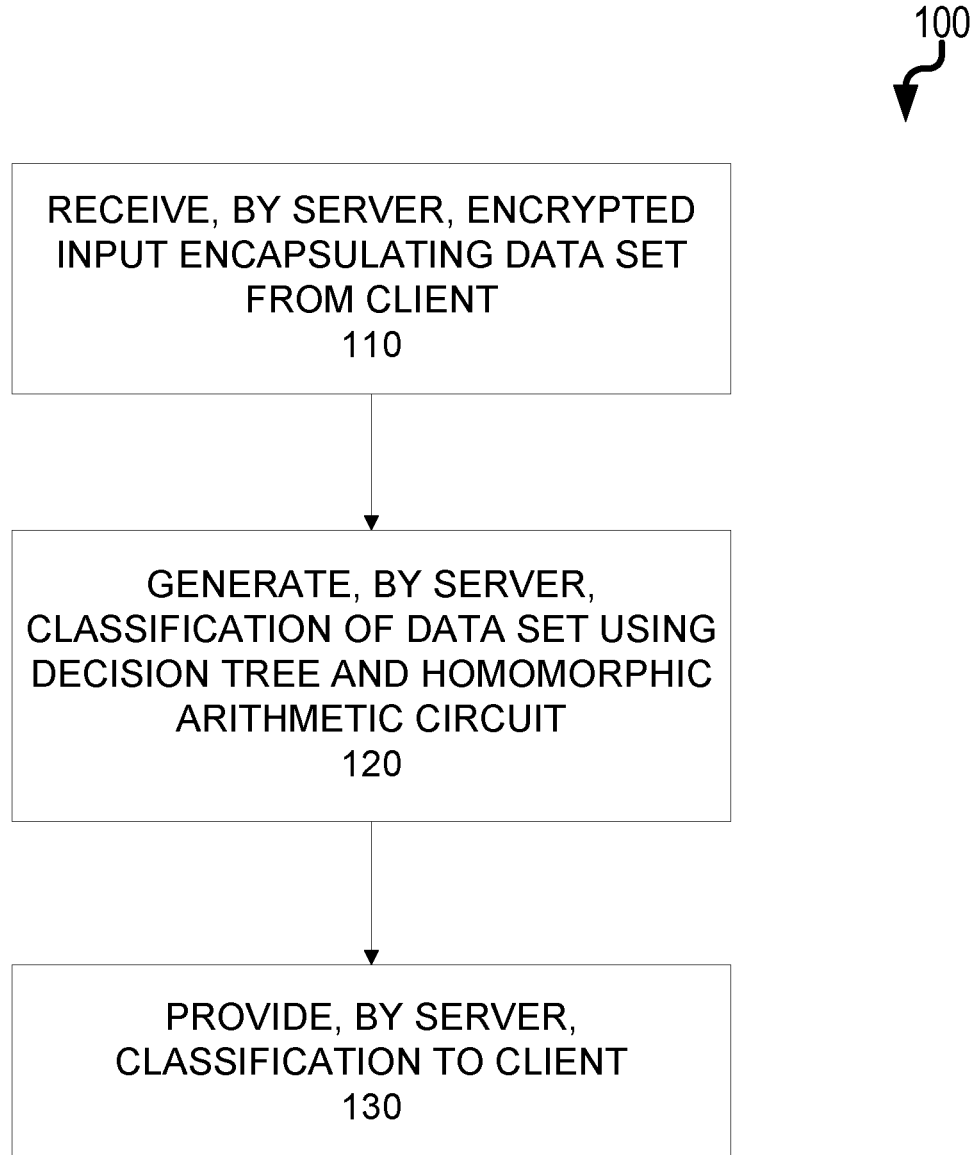
FIG. 1 is a process flow diagram illustrating private decision tree evaluation using an arithmetic circuit.

The current subject matter addresses the problem of privately evaluating a machine learning model such as a decision tree on private data. As will be described in more detail below, a server executes a private decision tree model and a client seeks to classify a private attribute vector using the server's private model. The goal of the computation is to obtain the classification while preserving the privacy of both—the decision tree and the client input. After the computation, the classification result is revealed only to the client, and beyond that, nothing further is revealed to neither party.

The following describes a client-server protocol that delegates the complete tree evaluation to the server while preserving privacy and keeping the performance acceptable. The current subject matter can use fully (somewhat) homomorphic encryption and evaluate decision trees on ciphertexts encrypted under the client's public key. As a result, no intermediate or final computational result is revealed to the evaluating server. The core operation in a decision tree evaluation is the comparison of integer. This comparison can be done using a binary circuit with the advantage of having a decision tree protocol with sublinear (in the size of the tree) to constant communication. However, comparing two $\mu$-bit integers using a binary circuit requires a circuit with a depth of $\log(\mu-1)+1$ and $\mathcal{O}(\mu \log(\mu))$ homomorphic multiplications. As such, a modified version of the integer comparison is provided herein such that it can be evaluated using an arithmetic homomorphic circuit. The resulting circuit has depth of $\log(\mu-1)$ and requires exactly $\log(\mu)$ multiplications. Moreover, when used for decision trees, the arithmetic comparison circuit does not increase the circuit multiplicative depth of the decision tree evaluation as the binary comparison circuit.

A homomorphic encryption (HE) allows computations on ciphertexts by generating an encrypted result whose decryption matches the result of a function on the plaintexts. Homomorphic encryption schemes (particularly lattice-based) can be used that allow many chained additions and multiplications to be computed on plaintext homomorphically. A HE scheme consists of the following algorithms:

pk, sk, ek←KGen ($\lambda$): This probabilistic algorithm takes a security parameter $\lambda$ and outputs public, private and evaluation key pk, sk and ek.

c←Enc(pk,m). This probabilistic algorithm takes pk and a message m and outputs a ciphertext c. [[m]] is used herein as a shorthand notation for Enc(pk,m).

c←Eval(ek,f,$c_1$, . . . , $c_n$): This probabilistic algorithm takes ek, an n-ary function $f$ and n ciphertexts $c_1$, . . . , $c_n$ and outputs a ciphertext c.

m'←Dec(sk, c): This deterministic algorithm takes sk and a ciphertext c and outputs a message m'.

With the current subject matter, the homomorphic encryption should have the property of indistinguishability under Chosen Plaintext Attack techniques (IND-CPA) and the following correctness conditions for all $m_1$, . . . , $m_n$:

Dec (sk, Enc(pk, $m_i$))=Dec(sk, [[$m_i$]])=$m_i$,

Dec(sk Eval(ek, f, [[$m_1$]], . . . , [[$m_n$]])=Dec(sk, [[$f$($m_1$, . . . , $m_n$)]]).

The encryption algorithm Enc adds "noise" to the ciphertext which increases during homomorphic evaluation. While addition of ciphertexts increases the noise linearly, the multiplication increases it exponentially. If the noise becomes too large, then correct decryption is no longer possible. To prevent this from happening, one can either keep the circuit's depth of the function flow enough or use a refresh algorithm. This algorithm consists of the bootstrapping procedure, which takes a ciphertext with large noise and outputs a ciphertext (of the same message) with a smaller amount of noise. With the current subject matter, the circuit's depth is kept low to ensure that the noise does not overwhelm the ciphertext and prevent correct decryption. This allows the usage of somewhat homomorphic encryption (SHE) and avoid bootstrapping. Therefore, in the current subject matter, the homomorphic operations will be prefixed with "SHE" for somewhat homomorphic encryption.

A Brakerski-Gentry-Vaikuntanathan (BGV) type homomorphic encryption scheme can be used. Plaintexts can be encrypted using an integer representation (an integer $x_i$ is encrypted as [[$x_i$]]) or a binary representation (each bit of the bit representation $x_i^b=x_{i\mu} \ldots x_{i1}$ is encrypted). The encryption scheme as required herein can support Smart and Vercauteren's ciphertext packing (SVCP) technique to pack many plaintexts in one ciphertext. Using SVCP, a ciphertext consists of a fixed number s of slots, each capable of holding one plaintext, i.e. [[•|• . . . |•]]. The encryption of a bit b replicates b to all slots, i.e., [[b]]=[b|b| . . . |b]]. However, the bits of $x_i^b$ can be packed in one ciphertext and denoted by [[$\vec{x}_i$]]=[[$x_{i\mu}$| . . . |$x_{i1}$|0| . . . |0]]. The computation relies on some built-in routines, that allow homomorphic operations on encrypted data. The relevant routines required to the homomorphic encryption scheme are: addition (SHEADD), multiplication (SHEMULT) and comparison (SHECMP). These routines are compatible with the ciphertext packing technique (i.e., operations are replicated on all slots in a SIMD manner).

The routine SHEADD takes two or more ciphertexts and performs a component-wise addition modulo two, i.e., we have:

SHEADD([[$b_{i1}$| . . . |$b_{is}$]],[[$b_{j1}$| . . . |$b_{js}$]])= [[$b_{i1} \oplus b_{j1}$| . . . |$b_{is} \oplus b_{js}$]].

Similarly, SHEMULT performs component-wise multiplication modulo two, i.e., there is:

SHEMULT([[$b_{i1}$| . . . |$b_{is}$]],[[$b_{j1}$| . . . |$b_{js}$]])= [[$b_{i1} \cdot b_{j1}$| . . . |$b_{is} \cdot b_{js}$]]

Let $x_i$, $x_j$ be two integers, $b_{ij}$=[$x_i$>$x_j$] and $b_{ji}$ [$x_j$>$x_i$], the routine SHECMP takes [[$x_i^b$]], [[$x_j^b$]] compares $x_i$ and $x_j$ and returns [[$b_{ij}$]], [[$b_{ji}$]]:

[[$b_{ij}$]],[[$b_{ji}$]]←SHECMP([[$x_i^b$]],[[$x_j^b$]]).

Note that if the inputs to SHECMP encrypt the same value, then the routine outputs two ciphertexts of 0. This routine implements the comparison circuit described in.

Beyond arithmetic and comparison operation, it is assumed that the encryption support shift operations. Given a packed ciphertext [[$b_1$| . . . |$b_s$]], the shift left operation SHESHIFTL shifts all slots to the left by a given offset, using zero-fill, i.e., we have:

SheShift$L$([[$b_1$| . . . |$b_s$]],$i$)=[$b_i$| . . . |$b_s$|0| . . . |0]].

The shift right operation is defined similarly for shifting to the right.

With the current subject matter, a decision tree (DT) is a function $$\mathcal{T}: \mathbb{Z}^n \to \{c_0, \ldots, c_{k-1}\}$$

that maps an n-dimensional attribute vector ($x_0$, . . . , $x_{n-1}$) to a finite set of classification labels. The tree consists of:

internal nodes (decision nodes) containing a test condition
leave nodes containing a classification label.

A decision tree model consists of a decision tree and the following functions:

a function thr that assigns to each decision node a threshold value, thr: [0, m−1]→$\mathbb{Z}$, a function att that assigns to each decision node an attribute index, att: [0, m−1]→[0, n−1], and a labeling function lab that assigns to each leaf node a label, lab: [m, M−1]→{$c_0$, . . . , $c_{k-1}$}.

The decision at each decision node is a "greater-than" comparison between the assigned threshold and attribute values, i.e., the decision at node v is $[x_{att(v)} \geq thr(v)]$.

Given a decision tree, the index of a node is its order as computed by breadth-first search (BFS) traversal, starting at the root with index 0. If the tree is complete, then a node with index v has left child 2v+1 and right child 2v+2.

The node with index v as the node v. W.l.o.g, [0, k−1] will be used as classification labels (i.e., $c_j$=j for $0 \leq j \leq k−1$) and the first (second, third, . . . ) leaf in BFS traversal will be labeled with classification label 0 (1, 2, . . . ). For a complete decision tree with depth d the leaves have indices ranging from $2^d$, $2^d+1$, . . . , $2^{d+1}−2$ and classification labels ranging from 0, . . . , $2^d−1$ respectively. Since the classification labeling is now independent of the tree, $\mathcal{M}$ =(T, thr, att) can be used to denote a decision tree model consisting of a tree T and the labeling functions thr, att as defined above. It can be assumed that the tree parameters d, m, $\mathcal{M}$ can be derived from $\mathcal{T}$.

Given $x=(x_0, \ldots, x_{n-1})$ and $\mathcal{M}$ =(T, thr, att), then starting at the root, the Decision Tree Evaluation (DTE) evaluates at each reached node v the decision $b \leftarrow [x_{att(v)} \geq thr(v)]$ and moves either to the left (if b=0) or right (if b=1) subsequent node. The evaluation returns the label of the reached leaf as result of the computation. This result can be denoted by $\mathcal{T}(x)$.

Let $x=(x_0, \ldots, x_{n-1})$ be a client's private attribute vector and $\mathcal{M} = \mathcal{T}$, thr, att) be a server's private decision tree model. A private DTE (PDTE) functionality evaluates the model $\mathcal{M}$ on input x, then reveals to the client the classification label $\mathcal{T}(x)$ and nothing else, while the server learns nothing, i.e., $$\mathcal{F}_{PDTE}(\mathcal{M}, x) \to (\epsilon, \mathcal{T}(x))$$

Let $x=(x_0, \ldots, x_{n-1})$ be a client's private attribute vector and $\mathcal{M} =(\mathcal{T}, thr, att)$ be a server's private decision tree model. A protocol Π correctly implements a PDTE functionality if after the computation it holds for the result c obtained by the client that $c= \mathcal{T}(x)$.

Besides correctness, parties must learn only what they are allowed to. To formalize this, the following two definitions are needed. A function μ: $\mathbb{N} \to \mathbb{R}$ is negligible if for every positive polynomial p(.) there exists an ϵ such that for all n>ϵ: μ(n)<1/p(n). Two distributions $\mathcal{D}_1$ and $\mathcal{D}_2$ are computationally indistinguishable $$\left(\text{denoted } \mathcal{D}_1 \stackrel{c}{\equiv} \mathcal{D}_2\right)$$

if no probabilistic polynomial time (PPT) algorithm can distinguish them except with negligible probability.

In SMC protocols, the view of a party consists of its input and the sequence of messages that it has received during the protocol execution. The protocol is said to be secure, if for each party, one can construct a simulator that, given only the input of that party and the output, can generate a distribution that is computationally indistinguishable to the party's view.

With regard to PDTE Security, let $x=(x_0, \ldots, x_{n-1})$ be a client's private attribute vector and $\mathcal{M} =(\mathcal{T}, thr, att)$ be a server's private decision tree model. A protocol $\Pi_{PDTE}$ securely implements the PDTE functionality in the semi-honest model if the following conditions hold:

there exists a PPT algorithm $\text{Sim}_S^{pdte}$ that simulates the server's view $\text{View}_S^{\Pi_{PDTE}}$ given only the private decision tree model ($\mathcal{T}$, thr, att) such that:

$$\text{Sim}_S^{pdte}(\mathcal{M}, \varepsilon) \stackrel{c}{\equiv} \text{Views}_S^{\Pi_{PDTE}}(\mathcal{M}, x) \qquad (1)$$

there exists a PPT algorithm $\text{Sim}_C^{pdte}$ that simulates the client's view $\text{View}_C^{\Pi_{PDTE}}$ given only the depth d of the tree, $x=(x_0, \ldots, x_{n-i})$ and a classification label $\mathcal{T}(x) \in \{0, \ldots, k-1\}$ such that:

$$\text{Sim}_C^{pdte}(\langle d, x \rangle, \mathcal{T}(x)) \stackrel{c}{\equiv} \text{Views}_C^{\Pi_{PDTE}}(\mathcal{M}, x) \qquad (2)$$

A protocol $\Pi_{PDTE}$ securely implements the PDTE functionality with one-sided simulation if the following conditions hold:
for every pair x, x' of different client's input vector it holds:

$$\text{View}_S^{\Pi_{PDTE}}(\mathcal{M}, x) \stackrel{c}{\equiv} \text{View}_S^{\Pi_{PDTE}}(\mathcal{M}, x'), \qquad (3)$$

$\Pi_{PDTE}$ is simulatable against every PPT adversary controlling C.

Note that for the one-sided simulation, the requirement in Equation 3 is that the protocol should be indistinguishable against any PPT adversary that controls the server. This means, the server should not be able to distinguish between the case where the client uses x and the case where it uses x'. Moreover, the protocol should be simulatable in against any adversary controlling the client.

The following describes a comparison protocol using an integer encoding which is based on Lin and Tzeng protocol. Let $x_i$ and $x_j$ be inputs of client and server, respectively, with the goal to compute $[x_i > x_j]$. With regard to input encoding, let $\text{INT}(y_\eta \ldots y_1)=y$ be a function that takes a bit string of length η and parses it into the η-bit integer $y=\Sigma_{i=1}^{\eta} y_{i} \cdot 2^{l-1}$. The 0-encoding $V_{x_i}^0$ and 1-encoding $V_{x_i}^1$ of an integer input $x_i$ are the following vectors: $V_{x_i}^0=(v_{i\mu}, \ldots, v_{i1})$, $V_{x_i}^1 (u_{i\mu}, \ldots, u_{i1})$, such that for each l, (1≤l≤μ)

$$v_{il} = \begin{cases} I_{NT}(x_{i\mu}x_{i\mu-1} \ldots x_{il}, 1) & \text{if } x_{il} = 0 \\ r_{il}^{(0)} & \text{if } x_{il} = 1 \end{cases}$$

$$u_{il} = \begin{cases} I_{NT}(x_{i\mu}x_{i\mu-1} \ldots x_{il}) & \text{if } x_{il} = 1 \\ r_{il}^{(1)} & \text{if } x_{il} = 0, \end{cases}$$

where l'=l+1, $r_{il}^{(0)}$, $r_{il}^{(1)}$ are random numbers of a fixed bitlength v>μ (e.g. $2^\mu \leq r_{il}^{(0)}, r_{il}^{(1)} < 2^{\mu+1}$ with $\text{LSB}(r_{il}^{(0)})=0$ and $\text{LSB}(r_{il}^{(1)})=1$ (LSB is the least significant bit). If the INT function is used the compute the element at position l, then we call it a proper encoded element otherwise we call it a random encoded element. Note that a random encoded element $r_{il}^{(1)}$ at position l in the 1-encoding of $x_i$ is chosen such that it is guaranteed to be different to a proper or random encoded element at position l in the 0-encoding of $x_j$, and vice versa. Hence, it enough if $r_{il}^{(1)}$ and $r_{il}^{(0)}$ are one or two bits longer than any possible proper encoding element at position l. Also note that the bit string $x_{i\mu}, x_{i\mu-1} \ldots x_{il}$ is interpreted by the function INT as the bit string $y_{\mu-l+1} \ldots y_l$ with length μ−l+1 where $y_1=x_{il}$, $y_2=x_i(l+1), \ldots, y_{\mu-l+1}=x_{i\mu}$. If we see $V_{x_i}^0$, $V_{x_j}^1$ as sets, then $x_i > x_j$ if they have exactly one common element.

For example, if $\mu=3$, $x_i=6=110_2$ and $x_j=2=010_2$ then $$V_{x_i}^1(\text{INT}(1),\text{Int}(11),r_{i1}^{(1)})=(1,3,r_{i1}^{(1)}),$$

$$V_{x_j}^0=(\text{INT}(1),r_2^{(0)}\text{INT}(011))=(1,r_{j2}^{(0)},3)$$

and $V_{xi}^1-V_{xj}^0=(0, r_2, r_1)$, where $r_2=3-r_{j2}^{(0)}$ and $r_1=r_{i1}^{(1)}-3$ are random numbers. On the other hand, if $x_i=2=010_2$ and $x_j=6=110_2$ then $V_{x_i}^1=(r_{i3}^{(1)},1,r_{i1}^{(1)})$, $V_{x_j}^0(r_{j3}^{(0)},r_{j2}^{(0)},y)$ and $V_{x_i}^1-V_{x_j}^0=(r_3,r_2,r_1)$ where $r_3=r_{i3}^{(1)}-r_{j3}^{(0)}$, $r_2=1-r_{j2}^{(0)}$ and $r_1=r_{i1}^{(1)}-7$ are all random numbers.

Let $x_i$ and $x_j$ be two integers, then $x_i > x_j$ iff $V=V_{x_i}^1-V_{x_j}^0$ has a unique position with 0.

A proof: if $V=V_{x_i}^1-V_{x_j}^0$ has a unique 0 at a position $l$, ($1 < l \leq \mu$) then $\mu_{il}$ and $v_{il}$ have bit representation $y_{\mu-l+1} \cdots y_1$, where for each $h$, $\mu-l+1 \geq h \geq 2$, $y_h=x_{ig}=x_{jg}$ with $g=l+h-1$, and $y_1=x_{il}=1$ and $x_{jl}=0$. It follows that $x_i > x_j$.

If $x_i > x_j$ then there exists a position $l$ such that for each $h$, $\mu \geq h \geq l+1$, $x_{ih}=x_{jh}$ and $x_{il}=1$ and $x_{jl}=0$. This implies $u_{il}=v_{il}$.

For $h$, $\mu \geq h \geq l+1$, either $u_{ih}$ bit string is a prefix of $x_i$ while $v_{jh}$ is random, or $u_{ih}$ is random while $v_{jh}$ bit string is a prefix of $x_j$. From the choice of $r_{ih}^{(0)}$, $r_{ih}^{(1)}$, we have $u_{ih} \neq v_{ih}$.

For $h$, $l-1 \geq h \geq 1$ there are three cases: $u_{ih}$ and $v_{ih}$ (as bit string) are both prefixes of $x_i$ and $x_j$, only one of them is prefix, both are random. For the first case the difference of the bits at position $l$ and for the other cases the choice of $r_{ih}^{(0)}$ imply that $u_{ih} \neq v_{ih}$. This concludes the proof.

Protocol: let $[[V_{xi}^0]]=[[v_{iu}]], \ldots, [[v_{i1}]]$ (respectively= $[[V_{x_i}^1]]=[[u_{iu}]], \ldots, [[u_{i1}]]$) denote the componentwise encryption of $V_{x_i}^0$ (resp. $V_{x_i}^1$). The client sends $[[V_{x_i}^0]]$, $[[V_{x_i}^1]]$ to the server. To determine the comparison bit for $x_i > x_j$, the server evaluates the function LIN COMPARE ($[[V_{x_i}^1]]$, $[[V_{x_i}^0]]$), (Algorithm 1) which returns $\mu$ ciphertexts among which exactly one encrypts zero if an only if $x_i > x_j$. For the decision tree evaluation, the server omits the randomization in Step 6 and the random permutation in Step 7, since this not the final result. Moreover, the server collects the difference ciphertexts $c_l$ in an array and uses the multiplication algorithm with logarithmic multiplicative depth.

In contrast to the original protocol, there can be differences such as:

Additively HE instead of multiplicative: As explained above multiplication increases the noise exponentially while addition increases it only linearly.

The INT function: Instead of relying on a collision-free hash function as the original protocol, we use the INT function which is simpler to implement and more efficient as it produces smaller values.

The choice of random encoded elements $r_{il}^{(0)}$, $r_{il}^{(1)}$: We choose the random encoded elements as explained above and encrypt them, while the original protocol uses ciphertexts chosen randomly in the ciphertext space.

Algorithm 1: Modified Lin-Tzeng Comparison Protocol

| | |
|---|---|
| 1: | function LINCOMPARE ($[[V_{x_i}^1]],[[V_{x_j}^0]]$) |
| 2: | parse $[[V_{x_i}^1]]$ as $[[u_{iu}]], \ldots, [[u_{i1}]]$ |
| 3: | parse $[[V_{x_j}^0]]$ as $[[v_{iu}]], \ldots, [[v_{i1}]]$ |
| 4: | for $l := 1$ to $\mu$ do |
| 5: | choose a random $r_l$ from the plaintext space |
| 6: | $c_l = [[(u_{il} - v_{jl}) \cdot r_l]]$ |
| 7: | choose a random permutation $\pi$ |
| 8: | return $\pi(c_\mu, \ldots, c_1)$ |

Encrypting the encodings on both side: In the original protocol, the evaluator has access to $x_j$ in plaintext and does not need to choose random encoded elements. By encoding as explained in our modified version, we can encrypt both encodings and delegate the evaluation to a third party which is not allowed to have access to the inputs in plaintext.

Aggregation: The multiplication of the ciphertexts returned by Algorithm 1 returns a ciphertext encrypting either 0 or a random number.

Edges of the tree can be marked with the corresponding comparison result. So if the comparison at node v is the bit b then the right edge is marked outgoing from v with b and the left edge is marked with 1−b. This information can be stored at the child nodes of v and refer to it as cmp.

For a decision tree model $\mathcal{M} = (\mathcal{T}, \text{thr}, \text{att})$, Node can be a data structure that for each node v defines the following:

v.threshold stores the threshold thr(v) of the node v
v.aIndex stores the associated index att(v)
v.parent stores the pointer to the parent node which is null for the root node
v.left stores the pointer to the left child node which is null for each leaf node Algorithm 2: Modified Lin-Tzeng Protocol for PDTE

| | |
|---|---|
| 1: | function LINCOMPAREDT ($[[V_{x_i}^1]],[[V_{x_j}^0]]$) |
| 2: | parse $[[V_{x_i}^1]]$ as $[[u_{iu}]], \ldots, [[u_{i1}]]$ |
| 3: | parse $[[V_{x_j}^0]]$ as $[[v_{iu}]], \ldots, [[v_{i1}]]$ |
| 4: | let queue be an empty queue |
| 5: | for $l := 1$ to $\mu$ do |
| 6: | $c_l = [[u_{il} - v_{jl}]]$ |
| 7: | queue. enqueue ($c_l$) |
| 8 | return LOGCHAINEDMUL (queue) |
| 1: | function LOGCHAINEDMUL (queue) |
| 2: | while queue.size( ) > 1 do |
| 3: | $c_1 \leftarrow$ queue.dequeue( ) |
| 4: | $c_2 \leftarrow$ queue.dequeue( ) |
| 5: | $c_2 \leftarrow c_2 \cdot c_1$ |
| 6: | queue. enqueue($c_2$) |
| 7: | return queue.dequeued( ) | v.right stores the pointer to the right child node which is null for each leaf node
v.cmp is computed during the tree evaluation and stores the comparison bit $b \leftarrow [x_{att(v.parent)} \geq \text{thr}(v.\text{parent})]$ if v is a right node. Otherwise it stores 1−b.
v.cLabel stores the classification label if v is a leaf node and the empty string otherwise.

$\mathcal{D}$ is used to denote the set of all decision nodes and $\mathcal{L}$ the set of all leave nodes of $\mathcal{M}$. As a result, the equivalent notation $\mathcal{M} = (\mathcal{T}, \text{thr}, \text{att})=(\mathcal{D}, \mathcal{L})$ can be used.

With the data structure defined above, the classification function can be defined as follows. Let $x=(x_0, \ldots, x_{n-1})$ be an attribute vector and $\mathcal{M} = (\mathcal{D}, \mathcal{L})$ a decision tree model. The classification function can be defined as:

$$f_c(x, \mathcal{M})=tr(x,\text{root}),$$

where root is the root node and tr is the traverse function defined as:

$$tr(x, v) = \begin{cases} tr(x, v.\text{left}) & \text{if } v \in \mathcal{D} \text{ and } x_{v.\text{aIndex}} < v.\text{threshold} \\ tr(x, v.\text{right}) & \text{if } v \in \mathcal{D} \text{ and } x_{v.\text{aIndex}} \geq v.\text{threshold} \\ v & \text{if } v \in \mathcal{L} \end{cases}$$

Let $x=(x_0, \ldots, x_{n-1})$ be an attribute vector and $\mathcal{M} = (\mathcal{T}, \text{thr}, \text{att})=(\mathcal{D}, \mathcal{L})$ a decision model such that:

$$\mathcal{T}(x)=b \cdot tr(x,\text{root} \cdot \text{right})+(1-b) \cdot tr(x,\text{root} \cdot \text{left}),$$

where $b=[x_{att(root)} \geq \text{thr}(\text{root})]$ is the comparison at the root node.

The proof follows by induction on the depth of the tree. In the base case, there is a tree of depth one (i.e., the root and two leaves). In the induction step, there are two trees of depth d which can be joined by adding a new root.

Initialization includes a one-time key generation in which the client generates appropriate triple (pk, sk, ek) of public, private and evaluation keys for a homomorphic encryption scheme. Then the client sends (pk, ek) to the server. For each input classification, the client just encrypts its input and sends it to the server. To reduce the communication cost of sending client's input, one can use a trusted randomizer that does not take part in the real protocol and is not allowed to collaborate with the server. The trusted randomizer generates a list of random strings r and sends the encrypted strings [[r]] to server and the list of r's to the client. For an input x, the client then sends x+r to the server in the real protocol. This technique is similar to the commodity-based cryptography with the difference that the client can play the role of the randomizer itself and sends the list of [[r]]'s (when the network is not too busy) before the protocol's start.

With regard to encoding and encrypting input, the protocol starts with the client encoding, encrypting and sending its input to the server. For each attribute value $x_i$ the client sends the encryptions $[[V_{x_i}^0]]=[[v_{iu}]], \ldots, [[v_{i1}]])$ and $[[V_{x_i}^1]]=([[u_{iu}]], \ldots, [[u_{i1}]])$ of the 0-encoding $V_{x_i}^0$ and 1-encoding $V_{x_i}^1$ of $x_i$. We let $$[[V_x]]=[([[V_{x_1}^0]],[[V_{x_1}^1]], \ldots ([[V_{x_n}^0]],[[V_{x_n}^1]])]$$

denote the encoding and encryption of all attribute values in x.

The server does the same with the threshold values. For each threshold value $y_j$ the server computes the encryptions $[[V_{y_j}^0]]=[[v_{ju}]], \ldots, [[v_{j1}]]$ and $[[V_{y_j}^1]]=[[u_{ju}]], \ldots, [[u_{j1}]])$ of the 0-encoding $V_{y_j}^0$ i and 1-encoding $V_{y_j}^1$ of $y_j$. We let $$[[V_D]]=\{([[V_{y_j}^0]],[[V_{y_j}^1]])|v \in \mathcal{D} \wedge v.\text{threshold}=y_j\}$$

denote the encoding and encryption of all threshold values in $\mathcal{D}$. This computation is illustrated by Encode(x) and Encode($\mathcal{D}$) in Protocol 6. Note that, this is still compatible with the trusted randomizer technique, where we will use sequences of random integers.

---

Algorithm 3: Computing Decision Bits

1: function EVALDNODE($\mathcal{D}$, [[$V_D$]], [[$V_x$]])
2:   for each v ∈ D do
3:     let $y_j$ ← v.threshold and i ← v.aIndex
4:     [[v.right.cmp]] ← LINCOMPAREDT ($[[V_{x_i}^1]],[[V_{y_j}^0]]$)
5:     [[r.left.cmp]] ← LINCOMPAREDT ($[[V_{y_j}^1]],[[V_{x_i}^0]]$)

---

Algorithm 4: Aggregating Decision Bits

1: function EVALPATHS($\mathcal{D}$, $\mathcal{L}$)
2:   for each v ∈ $\mathcal{L}$ do
3:     let $P_v$ be the array of nodes on the path (root → v)
4:     [[$\text{cost}_v$]] ← [[0]]
5:     for each u ∈ $P_v$ do
6:       [[$\text{cost}_v$]] ← [[$\text{cost}_v$]] + [u.cmp]

---

With regard to evaluating decision nodes, the server evaluates the comparison at each decision node. For each decision node v∈$\mathcal{D}$, let v.threshold=$y_j$ and i=v.aIndex. It can be assumed that $x_i \neq y_j$ for all i, j. The parties can ensure this by having the client adding a bit 0 to the bit representation of each $x_i$, and the server adding a bit 1 to the bit representation of each $y_j$ before encoding the values. Then from the definition of the tree evaluation, we move to the right if [$x_i \geq y_j$] or the left otherwise. This is equivalent of testing [$x_i > y_j$] or [$y_j > x_i$], since we assume $x_i \neq y_j$. Therefore, for each decision node $y_j$ with corresponding attribute $x_i$, the server uses LINCOMPAREDT ($[[V_{x_i}^1]], [[V_{y_j}^0]]$) to mark the edge right to $y_j$ (i.e., store it at the right child node of v) and LINCOMPAREDT ($[[V_{y_j}^1]], [[V_{x_i}^0]]$) to mark the edge left toy, (i.e., store it at the left child node of v). It is illustrated in Algorithm 3.

With regard to aggregating decision results, then for each node v∈$\mathcal{L}$, the server aggregates the comparison results along the path from the root to v. As a result of Algorithm 3, one edge of each decision node is marked with a ciphertext of 0, while the other will be marked with a ciphertext of a random plaintext. It follows that the sum of marks along each path of the tree, will result to an encryption of 0 for the classification path and an encryption of a random plaintext for other paths. This computation is illustrated in Algorithm 4.

To reveal the final result to the client, the following can be performed. For each ciphertext [[$\text{cost}_v$]] of Algorithm 4, the server chooses a random number $r_v$, computes [[$\text{result}_v$]] ← [[$\text{cost}_v \cdot r_v + $v.cLabel]] and sends the resulting ciphertexts to the client in a random order. This is illustrated in Algorithm 5. Alternatively, the server can make a trade-off between communication and computation by using the shift operation to pack many result, in a single ciphertext.

---

Algorithm 5: Finalizing

1:   function FINALIZE(-C)
2:   for each v ∈ $\mathcal{L}$ do
3:     choose a random number $r_v$
4:     [[$\text{result}_v$]] ← [[$\text{cost}_v \cdot r_v + $ v.cLabel]]

---

Protocol 6: The Basic Protocol

Client                         Server
Input: x                    Input: $\mathcal{M} = (\mathcal{D}, \mathcal{L})$
Output: $\mathcal{T}$(x)           Output: ε

$[[V_x]]$ ← ENCODE(x)   $\xrightarrow{[[V_x]]}$   $[[V_D]]$ ← ENCODE ($\mathcal{D}$)
                                          EVALDNODE($\mathcal{D}$, [[$V_D$]], [[$V_x$]])
                                          EVALPATHS($\mathcal{D}, \mathcal{L}$)
                                          [[$\mathcal{T}$(x)]] ← FINALIZE($\mathcal{L}$)

DECODE $\mathcal{T}$(x)   $\xleftarrow{[[\mathcal{T}(x)]]}$

---

As illustrated in Algorithm 6, the whole computation is performed by the server. The server sequentially computes the algorithms described above and sends the resulting ciphertexts to the client. The client decrypts and outputs the resulting classification label. The correctness is straightforward and follows from above.

With the current subject matter, ciphertext packing can be used to improve computation and communication. Ciphertext packing means that each ciphertext encrypts s bits, where s is the number of slots in the ciphertext. Then we can use this property in three different ways. First, one could pack each encoding (0 or 1) of each value (attribute or threshold) in a single ciphertext allowing the server to compute the difference in Step 6 LINCOMPAREDT( ) with one homomorphic operation (instead of μ). Second, one could encrypt several attributes together and classify them with a single protocol evaluation. Finally, one could encrypt multiple decision node thresholds that must be compared to the same attribute in the decision tree model.

Packing 0-Encodings and 1-Encodings. A modified Lin-Tzeng comparison as provided herein requires only component-wise subtraction and a multiplication of all components. Therefore, the client can pack the 0-encoding of each $x_i$ in one ciphertext and sends $[[v_{i\mu}| \ldots |v_{i1}|0| \ldots |0]]$ instead of $[[V_{x_i}^0]]$ (and similar for the 1-encoding). Then, the server does the same for each threshold value and evaluates the decision node by computing the differences $[[d_{ij}]] \leftarrow [[u_{i\mu} - v_{j\mu}| \ldots |u_{i1} - v_{j1}|0| \ldots |0]]$ with one homomorphic subtraction. To multiply the $\mu$ relevant components in $[[d_{ij}]]$, we use $|\mu|$ (bitlength of $\mu$) left shifts and $|\mu|$ multiplications to shift $\Pi_{i=1}^{\mu}(u_{i\mu} - v_{jl})$ to the first slot. The path evaluation and the computation of the result's ciphertext remain as explained above.

Packing Attribute Values. Let $x^{(1)}, \ldots, x^{(s)}$ be s possible attribute vectors with $x^{(l)} = [x_1^{(l)}, \ldots, x_n^{(l)}]$, $1 \leq l \leq s$. For each $x_i^{(l)}$, let $V_{x_i}^0{}^{(l)} = v_{i\mu}^{(l)}, \ldots, v_{i1}^{(l)}$ be the 0-encoding. Then, the client generates for each attribute $x_i$ the ciphertexts $[[cx_{i\mu}^0]], \ldots, [[cx_{i2}^0]], [[cx_{i1}^0]]$, as illustrated in Equation 4. The client does similarly for the 1-encodings.

$$[[cx_{i1}^0]] = [[v_{i1}^{(1)} | v_{i1}^{(2)}| \ldots |v_{i1}^{(s)}]] \quad (4)$$

$$[[cx_{i2}^0]] = [[v_{i2}^{(1)} | v_{i2}^{(2)}| \ldots |v_{i2}^{(s)}]] \text{Packing of multiple } V_{x_i}^0$$

$$\ldots$$

$$[[cx_{i\mu}^0]] = [[v_{i\mu}^{(1)} | v_{i\mu}^{(2)}| \ldots |v_{i\mu}^{(s)}]]$$

To shorten the notation, let $y_j$ denote the threshold of j-th decision node (i.e., $y_j = v_j.\text{threshold}$) and let $V_{y_j}^0 = v_{j\mu}, \ldots, v_{jl}$ be the corresponding 0-encoding. The server encrypts $V_{y_j}^0$ as illustrated in Equation 5. The 1-encoding is encrypted similarly.

$$[[cy_{j1}^0]] = [[v_{j1} | v_{j1}| \ldots |v_{j1}]] \quad (5)$$

$$[[cy_{j2}^0]] = [[v_{j2} | v_{j2}| \ldots |v_{j2}]] \text{Packing of single } V_{y_j}^0$$

$$\ldots$$

$$[[cy_{j\mu}^0]] = [[v_{j\mu} | v_{j\mu}| \ldots |v_{j\mu}]]$$

The above described encoding allows to compare s attribute values together with one threshold. This is possible because the routine LinCompareDT( ) is compatible with SVCP such that we have:

LinCompareDT((([[cx_{i\mu}^1]], . . . ,[[cx_{i1}^1]]),
 ([[cy_{j\mu}^0]], . . . ,[[cy_{j1}^0]]))=[[b_{ij}^{(1)}|b_{ij}^{(2)}| . . . |
 b_{ij}^{(s)}]], (6)

where $b_{ij}^{(l)} - 0$ if $x_i^{(l)} > y_j$ and $b_{ij}^{(l)}$ is a random number otherwise. This results in a single ciphertext such that the l-th slot contains the comparison result between $x_i^{(l)}$ and $y_j$.

Aggregating decision bits remains unchanged as described in Algorithm 4. This results in a packed ciphertext $[[b_v]] = [[b_v^{(1)}| \ldots |b_v^{(s)}]]$ for each leaf $v \in \mathcal{L}$, where $b_v^{(l)} = 0$ if $x^{(l)}$ classifies to leaf v and $b_u^{(l)}$ is a random number for any other leaf $u \in \mathcal{L} - \{v\}$. Algorithm 5 remains unchanged as well.

Packing Threshold Values. In this case, the client encrypts a single attribute in one ciphertext, while the server encrypts multiple threshold values in a single ciphertext. Hence, for an attribute value $x_i$, the client generates the ciphertexts as in Equation 7 for the 0-encoding and handles the 1-encoding similarly.

$$[[cx_{i1}^0]] = [[v_{i1} | v_{i1}| \ldots |v_{i1}]] \quad (7)$$

$$[[cx_{i2}^0]] = [[v_{i2} | v_{i2}| \ldots |v_{i2}]] \text{Packing of single } V_{x_i}^0$$

$$\ldots$$

$$[[cx_{i\mu}^0]] = [[v_{i\mu} | v_{i\mu}| \ldots |v_{i\mu}]]$$

Let $m_i$ be the number of decision nodes that compare to the attribute $x_i$ (i.e., $m_i = |\{v_j \in \mathcal{D} : v_j.\text{aIndex} = i\}|$). The server packs all corresponding threshold values in $$\lceil \frac{m_i}{s} \rceil$$

cyphertext(s) as illustrated in Equation 8 for the 0-encoding and handles the 1-encoding similarly.

$$[[cy_{j1}^0]] = [[v_{j_1 1} | \ldots |v_{j_{m_i} 1}| \ldots ]] \quad (8)$$

$$[[cy_{j2}^0]] = [[v_{j_1 2} | \ldots |v_{j_{m_i} 2}| \ldots ]] \text{Packing of multiple } V_{y_j}^0$$

$$\ldots$$

$$[[cy_{j\mu}^0]] = [[v_{j_1 \mu} | \ldots |v_{j_{m_i} \mu}| \ldots ]]$$

The packing of threshold values allows to compare one attribute value against multiple threshold values together. Unfortunately, the slot cannot be accessed while performing homomorphic operation. Hence, to aggregate the decision bits, $m_i$ copies of the resulting packed decision results can be made, and each decision result can be shifted to the first slot. Then the aggregation of the decision result and the finalizing algorithm work as in the previous case with the only difference that only the result in the first slot matters and the remaining slots can be set to 0.

FIG. 1 is a process flow diagram 100 in which, at 110, a server receives an encrypted input that encapsulates a data set. Thereafter, at 120, the server generates a classification based on the data set using a homomorphic arithmetic circuit. The generated classification is then provided by the server to the client, at 130, to enable the client to decrypt the classification.

Figure 2:
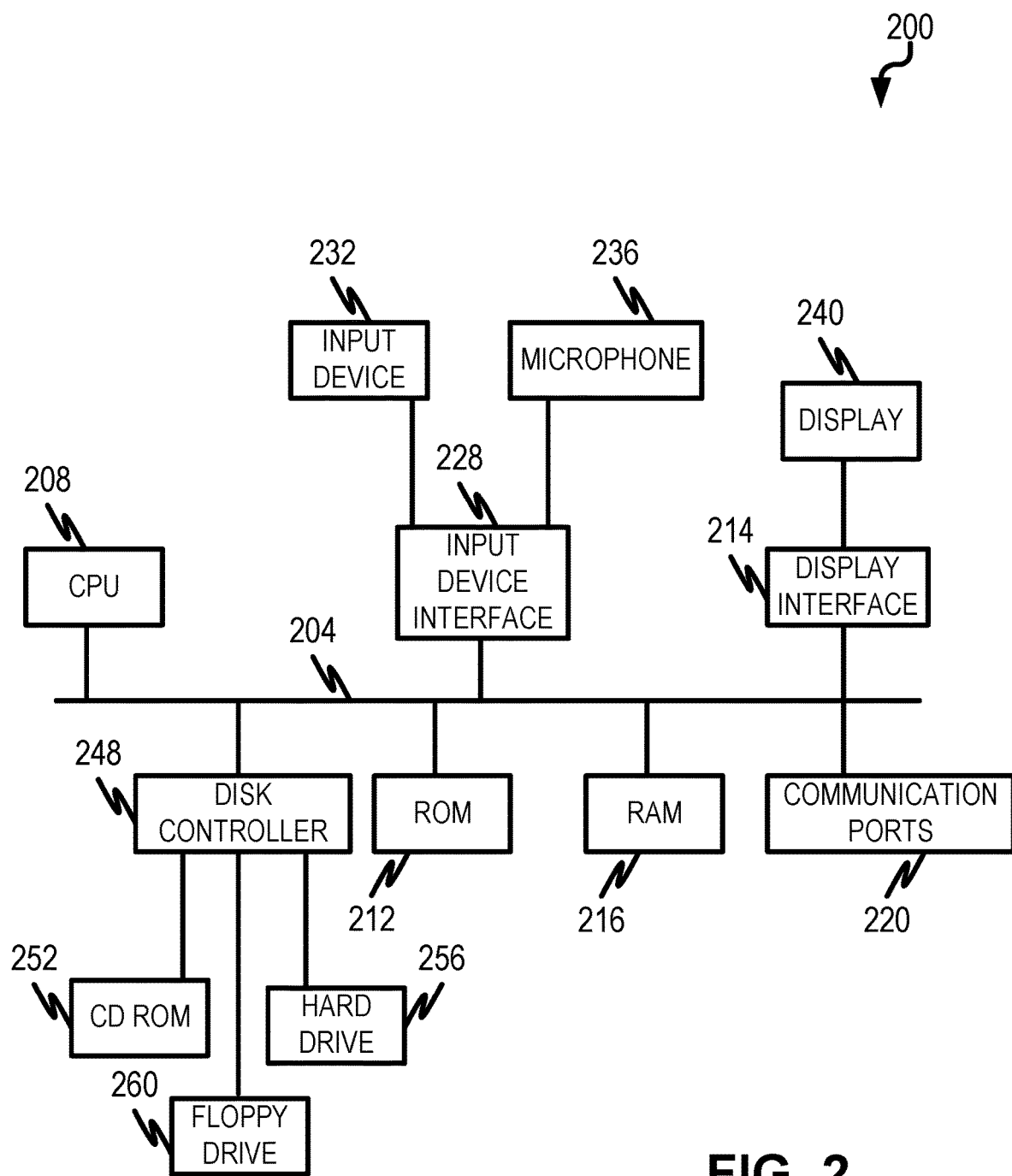
FIG. 2 is a diagram illustrating a computing device for implementing aspects of the current subject matter.

FIG. 2 is a diagram 200 illustrating a sample computing device architecture for implementing various aspects described herein. A bus 204 can serve as the information highway interconnecting the other illustrated components of the hardware. A processing system 208 labeled CPU (central processing unit) (e.g., one or more computer processors/data processors at a given computer or at multiple computers), can perform calculations and logic operations required to execute a program. A non-transitory processor-readable storage medium, such as read only memory (ROM) 212 and random access memory (RAM) 216, can be in communication with the processing system 208 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 248 can interface with one or more optional disk drives to the system bus 204. These disk drives can be external or internal floppy disk drives such as 260, external or internal CD-ROM, CD-R, CD-RW or DVD, or solid state drives such as 252, or external or internal hard drives 256. As indicated previously, these various disk drives 252, 256, 260 and disk controllers are optional devices. The system bus 204 can also include at least one communication port 220 to allow for communication with external devices either physically connected to the computing system or available externally through a wired or wireless network. In some cases, the at least one communication port 220 includes or otherwise comprises a network interface.

To provide for interaction with a user, the subject matter described herein can be implemented on a computing device having a display device 240 (e.g., a CRT (cathode ray tube) or LCD (liquid crystal display) monitor) for displaying information obtained from the bus 204 via a display interface 214 to the user and an input device 232 such as keyboard and/or a pointing device (e.g., a mouse or a trackball) and/or a touchscreen by which the user can provide input to the computer. Other kinds of input devices 232 can be used to provide for interaction with a user as well; for example, feedback provided to the user can be any form of sensory feedback (e.g., visual feedback, auditory feedback by way of a microphone 236, or tactile feedback); and input from the user can be received in any form, including acoustic, speech, or tactile input. The input device 232 and the microphone 236 can be coupled to and convey information via the bus 204 by way of an input device interface 228. Other computing devices, such as dedicated servers, can omit one or more of the display 240 and display interface 214, the input device 232, the microphone 236, and input device interface 228.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computerized method comprising:
   homomorphically encrypting a plaintext data set;
   receiving a plurality of random strings from a randomizer;
   forming an encrypted input comprising a combination of the plurality of random strings and the homomorphically encrypted data set;
   transmitting the encrypted input to a server executing a decision tree for evaluation of the encrypted input by the server using a homomorphic arithmetic circuit; and
   receiving, from the server, data characterizing the evaluation by the server; and
   decrypting the evaluation.

2. The computerized method of claim 1, wherein the evaluation includes a classification generated on the homomorphically encrypted data set using a decision tree.

3. The computerized method of claim 2, wherein the decision tree is a machine learning model that maps an n-dimensional attribute vector to a finite set of classification labels.

4. The computerized method of claim 3, wherein the decision tree comprises a plurality of internal nodes that each comprise a test condition, and a plurality of leaf nodes that each comprise a classification label.

5. The computerized method of claim 4, wherein the classification comprises the classification labels.

6. The computerized method of claim 1, wherein the forming an encrypted input includes encrypting a combination of the plurality of random strings and the homomorphically encrypted data set using a public key, a private key, and an evaluation key.

7. The computerized method of claim 6, further comprising:
   sending the public key and the evaluation key to the server.

8. A system comprising:
   at least one data processor; and
   memory storing instructions which, when executed by the at least one data processor, result in operations comprising:
   homomorphically encrypting a plaintext data set;
   receiving a plurality of random strings from a randomizer;
   forming an encrypted input comprising a combination of the plurality of random strings and the homomorphically encrypted data set;
   transmitting the encrypted input to a server executing a decision tree for evaluation using a homomorphic arithmetic circuit; and
   receiving, from the server, data characterizing the evaluation by the server; and
   decrypting the evaluation.

9. The system of claim 8, wherein the evaluation includes a classification generated on the homomorphically encrypted data set using a decision tree.

10. The system of claim 9, wherein the decision tree is a machine learning model that maps an n-dimensional attribute vector to a finite set of classification labels.

11. The system of claim 10, wherein the decision tree comprises a plurality of internal nodes that each comprise a test condition, and a plurality of leaf nodes that each comprise a classification label.

12. The system of claim 11, wherein the classification comprises the classification labels.

13. The system of claim 8, wherein the forming an encrypted input includes encrypting a combination of the plurality of random strings and the homomorphically encrypted data set using a public key, a private key, and an evaluation key.

14. The system of claim 13, wherein the operations further comprise:
   sending the public key and the evaluation key to the server.

15. A non-transitory machine-readable medium storing instructions which, when executed by one or more processors, cause the one or more processors to perform operations comprising:
   homomorphically encrypting a plaintext data set;
   receiving a plurality of random strings from a randomizer;
   forming an encrypted input comprising a combination of the plurality of random strings and the homomorphically encrypted data set;
   transmitting the encrypted input to a server executing a decision tree for evaluation using a homomorphic arithmetic circuit; and
   receiving, from the server, data characterizing the evaluation by the server; and
   decrypting the evaluation.

16. The non-transitory machine-readable medium of claim 15, wherein the evaluation includes a classification generated on the homomorphically encrypted data set using a decision tree.

17. The non-transitory machine-readable medium of claim 16, wherein the decision tree is a machine learning model that maps an n-dimensional attribute vector to a finite set of classification labels.

18. The non-transitory machine-readable medium of claim 17, wherein the decision tree comprises a plurality of internal nodes that each comprise a test condition, and a plurality of leaf nodes that each comprise a classification label.

19. The non-transitory machine-readable medium of claim 18, wherein the classification comprises the classification labels.

20. The non-transitory machine-readable medium of claim 15, wherein the forming an encrypted input includes encrypting a combination of the plurality of random strings and the homomorphically encrypted data set using a public key, a private key, and an evaluation key.

* * * * *